United States Patent [19]
Brown, deceased et al.

[11] 3,843,689

[45] Oct. 22, 1974

[54] N-CHLOROTHIO CARBAMATES

[75] Inventors: Melancthon S. Brown, deceased, late of Berkeley, Calif.; Gustave K. Kohn, administrator, Berkeley, Calif.

[73] Assignee: Chevron Research Company, San Francisco, Calif.

[22] Filed: May 8, 1972

[21] Appl. No.: 250,908

Related U.S. Application Data

[63] Continuation-in-part of Ser. Nos. 88,105, Nov. 9, 1970, Pat. No. 3,679,733, and Ser. No. 189,732, Oct. 15, 1971.

[52] U.S. Cl... 260/346.2 R, 260/479 C, 260/481 C, 424/300, 424/285
[51] Int. Cl.......................... C07c 69/62, C07d 5/36
[58] Field of Search...... 260/479 C, 481 C, 346.2 R

[56] References Cited
UNITED STATES PATENTS
3,699,122  10/1972  Kohn........................... 260/326.5 S Primary Examiner—John D. Randolph
Assistant Examiner—Bernard Dentz
Attorney, Agent, or Firm—G. F. Magdeburger; John Stoner, Jr.; Raymond Owyang

[57] ABSTRACT

N-chlorothio carbamates are produced by the reaction of sulfur dichloride and a carbamate having at least one hydrogen substituted on the carbamate nitrogen atom in the presence of a rate determining amount of an acid acceptor. The N-chlorothio carbamates are useful intermediates in the preparation of pesticides.

10 Claims, No Drawings

N-CHLOROTHIO CARBAMATES

CROSS REFERENCE TO RELATED APPLICATIONS

This application is a continuation-in-part of U.S. Ser. No. 88,105, filed Nov. 9, 1970, now U.S. Pat. No. 3,679,733, and U.S. Ser. No. 189,732, filed Oct. 15, 1971.

DESCRIPTION OF THE INVENTION

The N-chlorothio carbamates are represented by the formula (I):

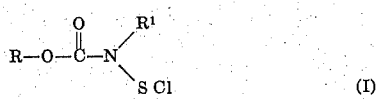

wherein R is a monovalent organo group of one to 20 carbon atoms, preferably one to 10 carbon atoms, and $R^1$ is hydrogen or a hydrocarbyl group of one to 10 carbon atoms.

The organo R is preferably free from non-aromatic unsaturation, e.g., from olefinic and acetylenic unsaturation. The R group is therefore suitably saturated aliphatic, i.e., acyclic saturated aliphatic as well as saturated cycloaliphatic, or is aromatic, preferably mononuclear or binuclear aromatic, and is a hydrocarbyl group containing only atoms of carbon and hydrogen or is a substituted hydrocarbyl group containing, in addition to atoms of carbon and hydrogen, other atoms such as oxygen, sulfur, nitrogen and halogen, particularly halogen of atomic number of from 9 to 53 inclusive, i.e., fluorine, chlorine, bromine or iodine, which additional atoms are present in functional groups such as alkoxy, aryloxy, carboalkoxy, alkanoyloxy, halo, trihalomethyl, cyano, nitro, dialkylamino, sulfonylalkyl, and like groups having no active hydrogen atoms.

The R groups are preferably hydrocarbyl groups containing only carbon and hydrogen or hydrocarbyl groups substituted with halogens, nitro groups, alkoxy groups of one to five carbon atoms, alkylthio groups of one to three carbon atoms, or dialkylamino groups in which the alkyl groups contain individually one to three carbon atoms. A particularly preferred R group is a 2,3-dihydro-7-benzofuranyl group represented by the formula (II):

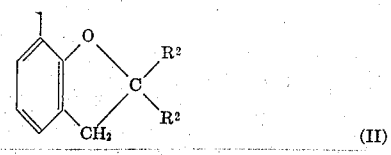

wherein the $R^2$ groups are the same or different $R^1$ groups.

Illustrative of suitable R groups are alkyl groups such as methyl, ethyl, isopropyl, propyl, isobutyl; cycloalkyl groups such as cyclopentyl and cyclohexyl and haloalkyl and halocycloalkyl groups, e.g., trichloromethyl, 4-bromohexyl, and 4-chlorocyclohexyl.

Aromatic R groups are exemplified by hydrocarbon aryl groups such as phenyl, naphthyl, alkaryl of seven to 10 carbon atoms such as tolyl, xylyl, 3-sec-butylphenyl, 2,3,5-trimethylphenyl, 3-sec-amylphenyl, 2,4-diisopropylphenyl, and aralkyl of 7 to 10 carbon atoms such as benzyl and 3-phenylpropyl. Halo, nitro, alkoxy, alkylthio and dialkylamino substituted aromatic groups are exemplified by 2-fluorophenyl, 3-fluorophenyl, 4-chlorophenyl, 2,4-difluorophenyl, 3,4-difluorophenyl, 2,4-dichlorophenyl, 3,4-dichlorophenyl, 2-nitrophenyl, 3-nitrophenyl, 4-nitrophenyl, 3,5-dinitrophenyl, 4-methoxyphenyl, 2-isopropoxyphenyl, 3-methylthiophenyl; 2-fluoro-4-methylphenyl, 2-chloro-3,4-dimethylphenyl, 3,5-dichloro-4-methylphenyl, 2-nitro-4-ethylphenyl, 4-nitrobenzyl, 2-fluorobenzyl, 4-methoxybenzyl, 4-methylthiobenzyl, 3,5-dimethyl-4-methylthiophenyl, 2,3-dihydro-2,2-dimethyl-7-benzofuranyl, 4-dimethylaminophenyl, and 3-methyl-4-dimethylaminophenyl.

Illustrative hydrocarbyl $R^1$ and $R^2$ groups are alkyl groups of one to six carbon atoms, such as methyl, ethyl, propyl and hexyl, and aromatic groups such as phenyl, aralkyl or alkaryl groups of seven to 10 carbon atoms, as illustrated above. The preferred $R^1$ and $R^2$ groups are alkyl of one to four carbon atoms, especially methyl.

Representative compounds include N-chlorothio-N-methyl-O-methyl carbamate, N-chlorothio-N-methyl-O-butyl carbamate, N-chlorothio-N-methyl-O-p-chlorocyclohexyl carbamate, N-chlorothio-N-methyl-O-tetrachloroethyl carbamate, N-chlorothio-N-methyl-O-phenyl carbamate, N-chlorothio-N-methyl-O-(α-naphthyl) carbamate, N-chlorothio-N-methyl-O-benzyl carbamate, N-chlorothio-N-methyl-O-p-chlorobenzyl carbamate, N-chlorothio-N-methyl-O-(3-sec-butylphenyl) carbamate, N-chlorothio-N-methyl-O-p-t-butylphenyl carbamate, N-chlorothio-N-ethyl-O-(β-naphthyl) carbamate, N-chlorothio-N-methyl-O-fluorophenyl carbamate, N-chlorothio-N-methyl-O-chlorophenyl carbamate, N-chlorothio-N-methyl-3,4-dichlorophenyl carbamate, N-chlorothio-O-p-fluorophenyl carbamate, N-chlorothio-N-methyl-O-(2,3-dihydro-2,2-dimethyl-7-benzofuranyl) carbamate, N-chlorothio-N-methyl-O-(2-isopropoxyphenyl) carbamate, N-chlorothio-N-methyl-O-(2,3,5-trimethylphenyl) carbamate, N-chlorothio-N-methyl-O-(2,4,5carbamate, N-chlorothio-N-methyl-O-(3-methyl-4-di-methylaminophenyl) carbamate, N-chlorothio-N-methyl-O-(3,5-dimethyl-4-methylthiophenyl) carbamate, N-chlorothio-N-phenyl-O-isopropyl carbamate, N-chlorothio-N-3-chlorophenyl-(O-isopropyl) carbamate, N-chlorothio-N-methyl-O-(2-chloro-3,4-dimethylphenyl) carbamate, N-chlorothio-N-methyl-O-(4-methyl-3,6-di-t-butylphenyl) carbamate, N-chlorothio-N-methyl-O-(α-naphthyl) carbamate, and N-chlorothio-N-(4-chlorophenyl-O-isopropyl carbamate.

Representative N-chlorothio compounds wherein R is a 2,3-dihydro-7-benzofuranyl group are O-2,3-dihydro-7-benzofuranyl-N-chlorothio carbamate, O-2,3-dihydro-2-methyl-7-benzofuranyl-N-methyl-N-chlorothio carbamate, O-2,3-dihydro-2-ethyl-7-benzofuranyl-N-methyl-N-chlorothio carbamate, O-2,3-dihydro-2,2-diethyl-7-benzofuranyl-N-methyl-N-chlorothio carbamate, O-2,3-dihydro-2,2-dimethyl-7-benzofuranyl-N-ethyl-N-chlorothio carbamate, O-2,3-dihydro-2-phenyl-7-benzofuranyl-N-methyl-N-chlorothio carbamate, O-2,3-di-hydro-2,2-dimethyl-7-benzofuranyl-N-phenyl-N-chlorothio carbamate, O-2,3-dihydro-2,2-dimethyl-7-benzofuranyl-N-phenyl-N-chlorothio carbamate, O-

2,3-dihydro-2,2-dimethyl-7-benzofuranyl-N-cyclohexyl-N-chlorothio carbamate, O-2,3-dihydro-2,2-dimethyl-7-benzofuranyl-N-benzyl-N-chlorothio carbamate, and O-2,3-dihydro-2,2-dimethyl-7-benzofuranyl-N-methyl-N-chlorothio carbamate.

It is appreciated, of course, that the in compounds illustrated above, the groups prefixed by N, refer to the groups substituted on the carbamate nitrogen (e.g., R¹ of Formula I) and the group prefixed by O refers to the group substituted on the carbamate oxygen (i.e., R of Formula I).

The N-chlorothio carbamates are prepared in accordance with the following reaction:

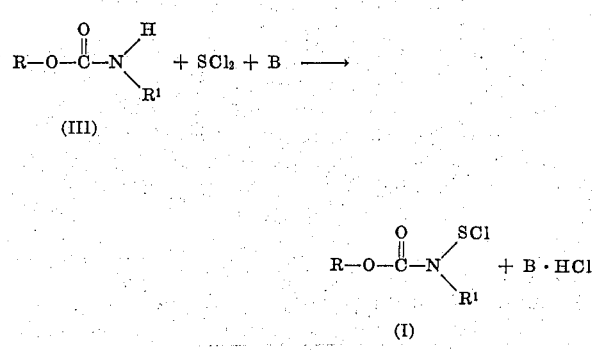

wherein R and R¹ have the same significance as previously defined and B is an acid acceptor.

The acid acceptor is an organic base such as a pyridine compound or a trialkylamine compound. Suitable pyridine compounds are pyridine and pyridine compounds of six to 10 carbon atoms and of 1 to 2 alkyl groups such as 2-methylpyridine, 2-ethylpyridine, 3-methylpyridine, 3,5-dimethylpyridine, and 2-butylpyridine. Suitable trialkylamines are those wherein the alkyl group contains individually 1 to 4 carbon atoms, such as trimethylamine, triethylamine, tripropylamine and tributylamine.

Generally, commerically available sulfur dichloride of reasonable purity, e.g., greater than 90–98 percent purity, is suitably employed. The sulfur dichloride may contain small amounts of an inhibitor such as tributylphosphate or triethylphosphate.

The sulfur dichloride and the carbamate compound are employed in substantially equimolar amounts, e.g., the molar ratio of sulfur dichloride to the carbamate compound generally varies from about 1.5:1 to 1:1.5, although molar ratios of sulfur dichloride to the carbamate compound of 1.4:1 to 1.1:1 are preferred. The molar ratios of acid acceptor to sulfur dichloride is also substantially equimolar, e.g., the molar ratio of acid acceptor to sulfur dichloride varies from about 1.2:1 to 1:1.2, although molar ratios of acid acceptor to sulfur dichloride of 1:1 to 1:1.2 are preferred.

In order to produce the N-chlorothio carbamate compounds of the invention in high yield, it is essential to react the carbamate and sulfur dichloride in the presence of a limited amount of free, uncomplexed acid acceptor. This is suitably accomplished by the addition of the acid acceptor to a substantially equimolar mixture of the carbamate and the sulfur dichloride so that the moles of free acid acceptor to the total moles of carbamate reactant and N-chlorothio carbamate is less than 0.2:1, preferably less than 0.1:1, and more preferably less than 0.05:1. In other words, during the course of the reaction between the sulfur di-chloride and the carbamate reactants, there should be at least 5 moles of the carbamate reactant and the N-chlorothio carbamate product per mole of acid acceptor which is not complexed with hydrochloric acid.

Provided that the reaction is conducted with the restricted amount of acid acceptor indicated above, the contacting of the acid acceptor with the mixture of the carbamate and the sulfur dichloride can be conducted by a variety of procedures. In one modification, the acid acceptor is added in increments, e.g., dropwise, in an inert diluent, if desired, to a mixture of the carbamate and sulfur dichloride in an inert diluent. In another modification, the acid acceptor is added continuously to a mixture of the carbamate and sulfur dichloride in an inert diluent.

Suitable inert diluents for the reaction include alkanes of five to 10 carbon atoms, such as hexane, isooctane and decane; aromatic compounds such as benzene and chlorobenzene; oxygenated hydrocarbons such as acyclic alkyl ethers, e.g., dimethoxyethane and dibutyl ether; and cycloalkyl ethers, e.g., dioxane, tetrahydrofuran and tetrahydropyran. Other suitable diluents include nitriles such as acetonitrile and propionitrile and dialkylamide such as dimethylformamide. Preferred diluents are chlorinated hydrocarbons of one to two carbon atoms, such as methylene dichloride, chloroform, carbon tetrachloride and ethylene dichloride. Generally, the amount of diluent employed ranges from 1 to 50 moles per mole of sulfur dichloride.

The reaction is suitably conducted at a temperature between −20°C. and the boiling point of the diluent, although temperatures between 0°C. and 50°C. are preferred. The reaction is conducted at or above atmospheric pressure.

The preparation of the N-chlorothio carbamates is illustrated by the following examples.

EXAMPLE 1

N-Chlorothio-N-methyl-O-methyl carbamate

O-methyl-N-methyl carbamate, 17.8 g (0.2 mole) was dissolved in 200 ml methylene dichloride. Sulfur dichloride, 26.7 g (0.26 mole) was added dropwise to the solution. Pyridine, 17.4 g (0.22 mole) was added to the solution at 25°–30°C. After the addition was complete, the pyridine hydrochloride product was filtered from the reaction mixture. Evaporation of the solvent and distillation under reduced pressure gave the N-chlorothio-N-methyl-O-methyl carbamate product. The nuclear magnetic reasonance spectrum of the product showed a sharp singlet at 3.45 ppm (relative to tetramethylsilane) for the N-methyl group. The N-methyl group of the O-methyl-N-methyl carbamate starting material appeared as a doublet at 2.9 ppm (relative to tetramethylsilane).

EXAMPLE 2

N-Chlorothio-N-methyl-O-(3-sec-butylphenyl) carbamate

N-methyl-O-(3-sec-butylphenyl) carbamate, 20.7 g (0.1 mole) was dissolved in 100 ml methylene chloride. Sulfur dichloride, 11.3 g (0.11 mole) was then added to the solution at about 25°C. Pyridine, 9.48 g (0.12 mole) was added dropwise to the solution at a temperature of 25°–30°C. The resulting pyridine hydrochloride product was filtered from the reaction mixture to give a solution of N-chlorothio-N-methyl-O-(3-sec-butylphenyl) carbamate product in methylene chloride. The nuclear magnetic resonance spectrum of the solution showed a sharp singlet at 3.4 ppm (relative to tetramethylsilane) for the N-methyl group of the product.

EXAMPLE 3

N-Chlorothio-N-methyl-O-(α-naphthyl) carbamate

N-methyl-O-(α-naphthyl) carbamate, 10.4 g (0.05 mole) and sulfur dichloride, 5.7 g (0055 mole) were slurried in 50 ml methylene dichloride. Pyridine, 4.7 g (0.06 mole) was then added dropwise at 25°–30°C. After the addition was complete, the pyridine hydrochloride was filtered from the reaction mixture to give a solution of the N-chlorothio-N-methyl-O-(α-naphthyl) carbamate product in methylene dichloride. The nuclear magnetic resonance spectrum of the product showed a sharp singlet at 3.6 ppm (relative to tetramethylsilane) for the N-methyl group of the product.

EXAMPLE 4

N-Chlorothio-N-methyl-O-(2,3-dihydro-2,2-dimethyl-7-benzofuranyl) carbamate

Pyridine, 9.8 g (0.12 mole) was added dropwise to a mixture of 22.1 g (0.1 mole) N-methyl-O-(2,3-dihydro-2,2-dimethyl-7-benzofuranyl) carbamate at 25°–30°C. The production of the N-chlorothio carbamate derivative was indicated by the nuclear magnetic resonance spectrum of the reaction mixture which showed a sharp singlet at 3.7 ppm (relative to tetramethylsilane) for the N-methyl group of the N-chlorothio-N-methyl-O-(2,3-dihydro-2,2-dimethyl-7-benzofuranyl) carbamate product.

A small amount of bis-[O-(2,3-dihydro-2,2-dimethyl-7-benzofuranyl)-N-methyl carbamoyl] sulfide is produced as a by-product of the above reaction. However, the preferred method for preparing this bis-carbamoyl sulfide is by the process of U.S. Ser. No. 88,105 of M. S. Brown and G. K. Kohn, filed Nov. 9, 1970, now U.S. Pat. No. 3,679,733.

EXAMPLE 5

For comparative purposes, the preparation of N-chlorothio-N-methyl-O-methyl carbamate was conducted in a series of experiments wherein the mode of addition of the reactants was varied. In Run 1, $SCl_2$ was added dropwise to a solution of the carbamate reactant (N-methyl-O-methyl carbamate) and pyridine. In Run 2, a mixture of the carbamate and pyridine was added dropwise to the sulfur di-chloride. In Runs 3–4, the pyridine was added dropwise to a mixture of the carbamate and sulfur dichloride. Runs 1–4 were all conducted at 25°–30°C. and in 100 ml of methylene dichloride. The yield of N-chlorothio-N-methyl-O-methyl carbamate was determined by converting the chlorothio carbamate to N-phenyldithio-N-methyl-O-methyl carbamate by reaction with benzenethiol (0.12–0.16 mole) according to the procedure described in Example 8. The yields of N-phenyldithio-N-methyl-O-methyl carbamate and bis-(N-methyl-O-methylcarbamoyl) sulfide [by-product formed by the reaction of one mole $SCl_2$ and two moles carbamate - S%, 15.3] were determined by gas chromatographic analysis. The reaction conditions and results are tabulated in Table I.

TABLE I

| RUN | MODE OF ADDITION | REACTANT(MOLES) | | | % YIELD | |
|---|---|---|---|---|---|---|
| | | CARBAMATE | $SCl_2$ | BASE | BIS-CARBAMOYL SULFIDE | PHENYLDITHIO CARBAMATE |
| 1 | $SCl_2$ to carbamate/base | 0.1 | 0.11 | 0.12 | 53.2 | 37 |
| 2 | Carbamate/base to $SCl_2$ | 0.1 | 0.11 | 0.12 | 25.3 | 27.4 |
| 3 | Base to carbamate/$SCl_2$ | 0.1 | 0.11 | 0.12 | 8.6 | 63.2 |
| 4 | Base to carbamate/$SCl_2$ | 0.1 | 0.13 | 0.11 | 0 | 71.3 |

UTILITY

The N-chlorothio carbamates are useful intermediates for the preparation of pesticides. For example, the N-chlorothio carbamates can be reacted with alcohols, mercaptans, ureas, carbamates, amines, amides, anilides, and other compounds have active hydrogen atoms to give the corresponding substitution product (and hydrochloric acid) by the conventional procedures employed for the reaction of sulfenyl halides and compounds having active hydrogen atoms, as disclosed, for example, by E. Kuhle, *Synthesis*, 617 (1971).

By way of illustration, representative N-chlorothio carbamates of the invention are converted to N-dithio carbamate compounds in the following examples:

EXAMPLE 6

Preparation of N-methyl-N-phenyldithio-O-(m-sec-butylphenyl) carbamate

A solution of about 0.1 mole N-chlorothio-N-methyl-O-(3-sec-butylphenyl) carbamate in 100 ml methylene dichloride was prepared as described in Example 2.

A solution of 11 g (0.1 mole) benzenethiol and 7.9 g (0.1 mole) pyridine in 20 ml methylene dichloride was added dropwise to the solution of N-chlorothio carbamate at 0°C. over a period of 5 minutes. Ten minutes after the addition was complete, the reaction was washed with water, washed with sodium bicarbonate solution, dried over magnesium sulfate and evaporated under reduced pressure to give 32.5 g of an oil residue. The oil was chromatographed over silica gel (hexane and ethyl ether-hexane eluents) to give the N-methyl-N-phenyldithio-O-(3-sec-butylphenyl) carbamate product. Elemental analysis for $C_{18}H_{21}NO_2S_2$ showed:

| | Calc. | Found |
|---|---|---|
| S % | 18.5 | 18.5 |

An acetone solution of the N-phenyldithio carbamate product containing a small amount of nonionic emulsifier was diluted with water to 500 ppm. Cabbage leaf sections were dipped in the solution and dried. The sections were then infested with cabbage looper larvae (Trichoplusia ni). After 24 hours, there was a 100 percent mortality of the cabbage looper larvae.

EXAMPLE 7

Preparation of N-methyl-N-methyldithio-O-( m-sec-butylphenyl) carbamate

A solution of about 0.1 mole of N-chlorothio-N-methyl-O-(3-sec-butylphenyl) carbamate in 100 ml of methylene dichloride was prepared as described in Example 2.

A solution of 4.8 g (0.1 mole) methyl mercaptan and 7.9 g (0.1 mole) pyridine in 20 ml methylene dichloride was added dropwise to the solution of the N-chlorothio carbamate at 0°C. over a period of 5 minutes. Ten minutes after the addition was complete, the reaction mixture was washed with water, washed with sodium bicarbonate solution, dried over magnesium sulfate and evaporated under reduced pressure to yield 27 g of an oil. The oil was chromatographed on silica gel (benzene eluent) to give the N-methyl-N-methyldithio-O-(3-sec-butylphenyl) carbamate product. The nuclear magnetic resonance spectrum of the product showed a singlet at 2.78 ppm (relative to tetramethylsilane) for the N-methyldithio group and a singlet at 3.4 ppm (relative to tetramethylsilane) for the N-methyl group. Elemental analysis for $C_{13}H_{19}NO_2S_2$ showed:

|   | Calc. | Found |
|---|---|---|
| S % | 22.5 | 23.3 |

By the procedure used in Example 6, methyldithio carbamate product was found to give 100% control of cabbage looper larvae.

EXAMPLE 8

Preparation of N-phenyldithio-N,O-dimethyl carbamate

A 17.4 g (0.22 mole) sample of pyridine was added dropwise to a solution of 19.8 g (0.2 mole) N-methyl-O-methyl carbamate and 26.8 g (0.26 mole) sulfur dichloride at 25°–30°C. over a period of five minutes. Five minutes after the addition was complete, pyridine hydrochloride was filtered and the filtrate was evaporated to give liquid residue. The residue was slurried with hexane to precipitate additional pyridine hydrochloride and evaporated under reduced pressure to give 28.1 grams of the N-chlorothio carbamate product.

To a solution of the N-chlorothio carbamate in 200 ml of methylene dichloride was added dropwise 18 g (0.16 mole) benzenethiol and 12.9 g (0.16 mole) pyridine at 0°C. After addition was comlete, the reaction mixture was washed with water, washed with sodium bicarbonate solution, dried over magnesium sulfate and evaporated to give 37.3 g (89.5 percent yield) of the N-phenyldithio-N-methyl-O-methyl carbamate product. A small sample was purified by column chromatography for elemental analysis, which showed:

|   | Calc. | Found |
|---|---|---|
| S % | 27.9 | 26.6 |

It is claimed:

1. N-chlorothio carbamates of the formula

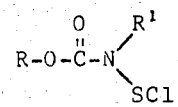

wherein R is an organo group of one to 20 carbon atoms and free from non-aromatic unsaturation selected from (1) alkyl, (2) cycloalkyl, (3) phenyl, (4) naphthyl, (5) alkylphenyl, (6) alkylnaphthyl, (7) phenalkyl, (8) naphthalkyl, (9) phenyl, naphthyl, alkylphenyl, alkylnaphthyl, phenylalkyl or naphthalkyl substituted with halogens of atomic number 9 to 35, nitro groups, alkoxy of one to five carbon atoms, alkylthio of one to three carbon atoms or dialkylamino in which the alkyl group contains individually 1 to 3 carbon atoms, and (8) 2,3-dihydro-7-benzofuranyl of the formula

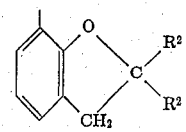

wherein $R^2$ individually is hydrogen or alkyl of one to six carbon atoms; and $R^1$ is hydrogen or an alkyl group of one to 10 carbon atoms.

2. The carbamate of claim 1 wherein $R^1$ is alkyl of one to six carbon atoms.
3. The carbamate of claim 2 wherein $R^1$ is methyl.
4. The carbamate of claim 3 wherein R is alkyl.
5. The carbamate of claim 4 wherein R is methyl.
6. The carbamate of claim 3 wherein R is phenyl, naphthyl, alkylphenyl, alkylnaphthyl, phenalkyl or naphthalkyl.
7. The carbamate of claim 6 wherein R is naphthyl.
8. The carbamate of claim 6 wherein R is m-sec-butylphenyl.
9. The carbamate of claim 2 wherein R is represented by the formula

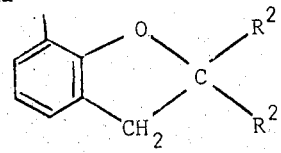

10. The carbamate of claim 9 wherein $R^1$ and the $R^2$ groups are methyl.

* * * * *